United States Patent

[11] 3,609,006

[72] Inventor Ladislav Pospisil
Veselicko, Czechoslovakia
[21] Appl. No. 839,990
[22] Filed July 8, 1969
[45] Patented Sept. 28, 1971
[73] Assignee Meopta narodni podnik
Prerov, Czechoslovakia
[32] Priority July 12, 1968
[33] Czechoslovakia
[31] PV 5120-68

[54] ZOOM PROJECTION LENS SYSTEM HAVING A MOVEABLE POSITIVE COMPONENT
4 Claims, 1 Drawing Fig.

[52] U.S. Cl..................................................... 350/184,
350/214
[51] Int. Cl..................................................... G02b 15/14
[50] Field of Search............................................. 350/184,
186

[56] References Cited
UNITED STATES PATENTS
3,227,042 1/1966 Smejkal et al. ................ 350/184
FOREIGN PATENTS
1,526,526 4/1968 France ......................... 350/184

*Primary Examiner*—John K. Corbin
*Attorney*—Richard Low

ABSTRACT: A three-member zoom projection lens system whose front member is an airspaced negative doublet, whose central element is a positive cemented doublet, and whose rear member consists of three simple lenses and a cemented doublet, the central member being axially movable between the fixed front and rear members. A lens combining an *f*-number of 1.2 with a ratio of maximum and minimum focal lengths of 2.4 in a projector for Super-8 motion picture film can be obtained by maintaining certain parameters in the lens design.

PATENTED SEP 28 1971 3,609,006
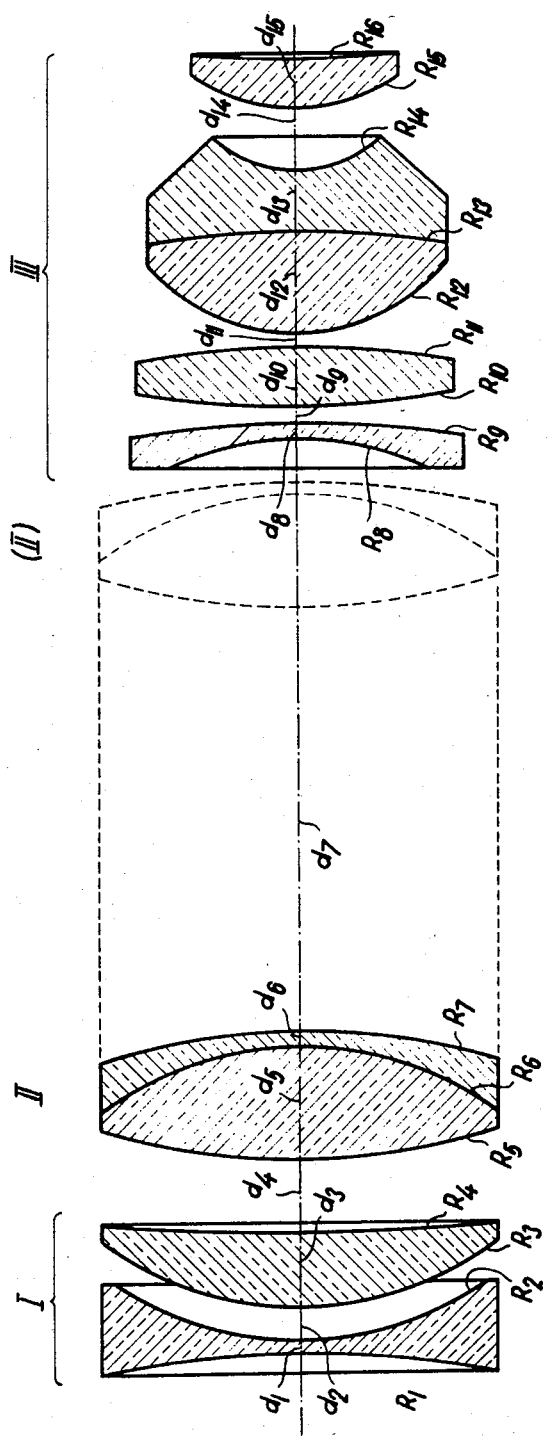
INVENTOR
Ladislav Pospíšil
BY

ZOOM PROJECTION LENS SYSTEM HAVING A MOVEABLE POSITIVE COMPONENT

This invention relates to zoom projection lenses, and particularly to an improved design in a three-member lens systems of the type in which the first and third members are fixed, the second member being axially movable, the first member being an airspaced negative doublet consisting of a simple divergent lens and a simple convergent lens, and the second member being a convergent cemented doublet.

The known zoom projection lens systems of the type described have f-numbers of at least 1.3, and a ratio of not more than 1.7 between the maximum and minimum focal lengths. Further improvements need particularly in projectors for Super-8 motion picture film were achieved heretofore only by relatively complex mechanical systems for shifting movable lens members.

The object of the invention is the provision of lens systems of the type described in which an increase in relative aperture over the limiting value indicated above and a wider variation in focal lengths is achieved without losing the basic mechanical simplicity of the original system.

In the lens system of the invention whose parameters selected within the ranges specified hereinbelow, an f-number of 1.2 may be had in combination with a focal length ratio of 2.4 and a maximum angle of view of 30°. Furthermore, the Petzval sum does not exceed a value of 0.2 for the smallest focal length, the longitudinal spherical aberration does not exceed 0.08 mm., and the residual aberration due to field curvature does not exceed 0.08 mm., over the entire range of focal lengths.

A necessary condition for achieving the results outlined above is a radius of curvature of the exposed convex surface of the convergent lens in the second member which is 1.3 to 1.7 times the radius of the corresponding surface of the divergent lens in the second member. Furthermore, the front face of the divergent lens in the first or front member must have a radius of curvature 2 to 3 times the corresponding radius of the rear face. Additionally, the first lens in the third member must be a negative, meniscus-shaped simple lens whose concavely arcuate front face has a radius of curvature smaller than that of any exposed surface in the first and second members and at least twice the radius of curvature of the rear surface in a cemented doublet which, in combination with three airspaced simple lenses, constitutes the third or rear member of the lens system. The indicated relationship of radii of curvature is important in reducing the magnitude of the residual aberration, and permits the desired improvement to be achieved in conjunction with the use of suitable selected lens elements.

The sole FIGURE of the drawing shows the general construction of the lens system of the invention in conventional representation.

The fixed first or front member I consists of a simple, biconcave lens and a meniscus shaped converging lens The axially movable second or central member II is a cemented doublet whose front component is biconvex, and whose rear component is a divergent meniscus, but the sequence of these components may be reversed. The fixed third or rear member consists, front to rear, of a divergent, meniscus shaped, simple lens, a biconvex simple lens, and cemented doublet whose front component is biconvex and whose rear component is biconcave, and a convergent, meniscus-shaped simple lens. The nine lens elements have a combined total of 16 refractive surfaces whose radii of curvature, in axial sequence, front to rear, and are $R_1$ to $R_{16}$. They have nine thicknesses, $d_1, d_3, d_5, d_6, d_8, d_{10}, d_{12}, d_{13}, d_{15}$, and are separated by six airspaces $d_2, d_4, d_7, d_9, d_{11}, d_{14}$. The radii of curvature, thicknesses, airspacings, refractive indices $n_d$, and Abbe numbers $V_d$ of four representative, specific embodiments of the invention are listed in the following examples. In these examples the numerical values or R and d are expressed in millimeters. All lenses have and f-number of 1.2 and focal lengths variable between 12.5 and 30 mm. for an image of Super-8 motion picture format.

EXAMPLE 1

| | | d | $n_d$ | $V_d$ |
|---|---|---|---|---|
| $R_1$ | −75.13 | | | |
| | | 1.5 | 1.62041 | 60.3 |
| $R_2$ | +26.911 | | | |
| | | 2.25 | | |
| $R_3$ | +32.43 | | | |
| | | 4.0 | 1.67270 | 32.3 |
| $R_4$ | +147.20 | | | |
| | | 47 to 4.2 | | |
| $R_5$ | +65.66 | | | |
| | | 7.0 | 1.65832 | 57.1 |
| $R_6$ | −22.081 | | | |
| | | 1.5 | 1.76182 | 26.5 |
| $R_7$ | −49.05 | | | |
| | | 2 to 44.8 | | |
| $R_8$ | −22.081 | | | |
| | | 1.5 | 1.67270 | 32.2 |
| $R_9$ | −42.073 | | | |
| | | 2.3 | | |
| $R_{10}$ | +59.98 | | | |
| | | 4.5 | 1.62606 | 39.1 |
| $R_{11}$ | −52.98 | | | |
| | | 0.1 | | |
| $R_{12}$ | +13.183 | | | |
| | | 7.0 | 1.65844 | 50.8 |
| $R_{13}$ | −30.058 | | | |
| | | 3.3 | 1.67270 | 32.2 |
| $R_{14}$ | +7.691 | | | |
| | | 1.1 | | |
| $R_{15}$ | −13.183 | | | |
| | | 2.0 | 1.65844 | 50.8 |
| $R_{16}$ | +147.20 | | | |

EXAMPLE 2

| | | d | $n_d$ | $V_d$ |
|---|---|---|---|---|
| $R_1$ | −60.0 | | | |
| | | 1.5 | 1.62041 | 60.3 |
| $R_2$ | +29.5 | | | |
| | | 2.25 | | |
| $R_3$ | +36.0 | | | |
| | | 4.0 | 1.67270 | 32.2 |
| $R_4$ | +270.0 | | | |
| | | 47 to 4.2 | | |
| $R_5$ | +70.0 | | | |
| | | 7.0 | 1.62041 | 60.3 $R_6$ |
| | −22.081 | | | |
| | | 1.5 | 1.76182 | 26.5 |
| $R_7$ | −43.0 | | | |
| | | 2 to 44.8 | | |
| $R_8$ | −20.5 | | | |
| | | 1.1 | 1.67270 | 32.2 |
| $R_9$ | −38.651 | | | |
| | | 0.1 | | |
| $R_{10}$ | +52.0 | | | |
| | | 4.5 | 1.62606 | 39.1 |
| $R_{11}$ | 42.98 | | | |
| | | 0.1 | | |
| $R_{12}$ | +13.8 | | | |
| | | 7.0 | 1.65844 | 50.8 |
| $R_{13}$ | −30.058 | | | |
| | | 3.8 | 1.67270 | 32.2 |
| $R_{14}$ | +7.691 | | | |
| | | 2.7 | | |
| $R_{15}$ | +13.183 | | | |
| | | 2.1 | | 50.8 |
| $R_{16}$ | +147.2 | | | |

EXAMPLE 3

|  | d | $n_d$ | $V_d$ |
|---|---|---|---|
| $R_1$ −75.13 | | | |
| | 1.5 | 1.62041 | 60.3 |
| $R_2$ +26.911 | | | |
| | 2.25 | | |
| $R_3$ +32.43 | | | |
| | 4.0 | 1.67260 | 32.2 |
| $R_4$ +147.2 | | | |
| | 47 to 4.2 | | |
| $R_5$ +49.05 | | | |
| | 1.5 | 1.76182 | 26.5 |
| $R_6$ +22.081 | | | |
| | 7.0 | 1.65382 | 57.1 |
| $R_7$ −65.66 | | | |
| | 2 to 44.8 | | |
| $R_8$ −22.081 | | | |
| | 1.5 | 1.67270 | 32.2 |
| $R_9$ −38.651 | | | |
| | 0.1 | | |
| $R_{10}$ +59.98 | | | |
| | 4.5 | 1.62606 | 39.1 |
| $R_{11}$ −52.98 | | | |
| | 0.1 | | |
| $R_{12}$ +13.183 | | | |
| | 7.0 | 1.65844 | 50.8 |
| $R_{13}$ −30.058 | | | |
| | 3.4 | 1.67270 | 32.2 |
| $R_{14}$ +7.691 | | | |
| | 3.1 | | |
| $R$ +13.183 | | | |
| | 2.0 | 1.65844 | 50.8 |
| $R_{16}$ +147.2 | | | |

It will be noted that the lens system whose parameters are given in example 3 deviates from the drawing in having a second or central member in which the front component is a divergent meniscus-shaped lens and the rear component is biconvex.

I claim:

1. In a zoom projection lens system having fixedly spaced front and rear members, and a central member axially movable between said front and rear members, said first member being negative and said second and third members being positive, said first member consisting of a simple divergent lens element and a simple convergent lens element, the second member being a cemented doublet having a first convergent lens element and a second divergent lens element, and the third member consisting of five lens elements including three simple lens elements and one cemented doublet, the improvement which comprises:
   a. the exposed surface of said first lens element having a radius of curvature 1.3 to 1.7 times the radius of curvature of the exposed surface of said second lens element;
   b. the front surface of the divergent lens in said first member having a radius of curvature 2 to 3 times the radius of curvature of the rear surface of said divergent lens;
   c. the first lens of said third member being a negative, meniscus-shaped simple lens having a negatively refractive surface of a radius of curvature smaller than the radius of curvature of any exposed surface in said first and second members and at least twice the radius of curvature of the rear surface of said cemented doublet in said third member.

2. In a lens system as set forth in claim 1, said member consisting of nine lens elements having a combined total of 16 refractive surfaces, the radii of curvature of said refractive surfaces, in axial sequence front to rear, being $R_1$ to $R_{16}$, the thicknesses of said nine lens elements being $d_1$, $d_3$, $d_5$, $d_6$, $d_8$, $d_{10}$, $d_{12}$, $d_{13}$, $d_{15}$, said nine lens elements constituting seven lenses separated by air spaces $d_2$, $d_4$, $d_7$, $d_{11}$, $d_{14}$, said radii of curvature, thicknesses, and airspaces having magnitudes, in consistent units of length, substantially as listed below, and said nine lens elements having indices of refraction $n_d$ and Abbe number $V_d$ substantially as listed below

|  | d | $n_d$ | $V_d$ |
|---|---|---|---|
| $R_1$ −75.13 | | | |
| | 1.5 | 1.62041 | 60.3 |
| $R_2$ +26.911 | | | |
| | 2.25 | | |
| $R_3$ +32.43 | | | |
| | 4.0 | 1.67270 | 32.3 |
| $R_4$ +147.20 | | | |
| | 47 to 4.2 | | |
| $R_5$ +65.66 | | | |
| | 7.0 | 1.65832 | 57.1 |
| $R_6$ −22.081 | | | |
| | 1.5 | 1.76182 | 26.5 |
| $R_7$ −49.05 | | | |
| | 2 to 44.8 | | |
| $R_8$ −22.081 | | | |
| | 1.5 | 1.67270 | 32.2 |
| $R_9$ −42.073 | | | |
| | 2.3 | | |
| $R_{10}$ +59.98 | | | |
| | 4.5 | 1.62606 | 39.1 |
| $R_{11}$ −52.98 | | | |
| | 0.1 | | |
| $R_{12}$ +13.183 | | | |
| | 7.0 | 1.65844 | 50.8 |
| $R_{13}$ −30.058 | | | |
| | 3.3 | 1.67270 | 32.2 |
| $R_{14}$ +7.691 | | | |
| | 1.1 | | |
| $R_{15}$ +13.183 | | | |
| | 2.0 | 1.65844 | 50.8 |
| $R_{16}$ +147.20 | | | |

3. In a lens system as set forth in claim 1, said members consisting of nine lens elements having a combined total of 16 refractive surfaces, the radii of curvature of said refractive surfaces, in axial sequence front to rear, being $R_1$ to $R_{16}$, the thicknesses of said nine lens elements being $d_1$, $d_3$, $d_5$, $d_6$, $d_8$, $d_{10}$, $d_{12}$, $d_{13}$, $d_{15}$, said nine lens elements constituting seven lenses separated by air spaces $d_2$, $d_4$, $d_7$, $d_9$, $d_{11}$, $d_{14}$, said radii of curvature, thicknesses, and airspaces having magnitudes, in consistent units of length, substantially as listed below, and said nine lens elements having indices of refraction $n_d$ and Abbe number $V_d$ substantially as listed below

|  | d | $n_d$ | $V_d$ |
|---|---|---|---|
| $R_1$ −60.0 | | | |
| | 1.5 | 1.62041 | 60.3 |
| $R_2$ +29.5 | | | |
| | 2.25 | | |
| $R_3$ +36.0 | | | |
| | 4.0 | 1.67270 | 32.2 |

Table — Continued

| | | d | $n_d$ | $V_d$ |
|---|---|---|---|---|
| $R_4$ | +270.0 | | | |
| | | 47 to 4.2 | | |
| $R_5$ | +70.0 | | | |
| | | 7.0 | 1.62041 | 60.3 |
| $R_6$ | −22.081 | | | |
| | | 1.5 | 1.76182 | 26.5 |
| $R_7$ | −43.0 | | | |
| | | 2 to 44.8 | | |
| $R_8$ | −20.5 | | | |
| | | 1.1 | 1.67270 | 32.2 |
| $R_9$ | −38.651 | | | |
| | | 0.1 | | |
| $R_{10}$ | +52.0 | | | |
| | | 4.5 | 1.62606 | 39.1 |
| $R_{11}$ | −42.98 | | | |
| | | 0.1 | | |
| $R_{12}$ | +13.8 | | | |
| | | 7.0 | 1.65844 | 50.8 |
| $R_{13}$ | −30.058 | | | |
| | | 3.8 | 1.67270 | 32.2 |
| $R_{14}$ | +7.691 | | | |
| | | 2.7 | | |
| $R_{15}$ | +13.183 | | | |
| | | 2.1 | 1.65844 | 50.8 |
| $R_{16}$ | +147.2 | | | |

4. In a lens system as set forth in claim 1, said members consisting of nine lens elements having a combined total of 16 refractive surfaces, the radii of curvature of said refractive surfaces, in axial sequence front to rear, being $R_1$ to $R_{16}$, the thicknesses of said nine lens elements being $d_1$, $d_3$, $d_5$, $d_6$, $d_8$, $d_{10}$, $d_{12}$, $d_{13}$, $d_{15}$, said nine lens elements constituting seven lenses separated by airspaces $d_2$, $d_4$, $d_7$, $d_9$, $d_{11}$, $d_{14}$, said radii of curvature, thicknesses, and airspaces having magnitudes, in consistent units of length, substantially as listed below, and said nine lens elements having indices of refraction $n_d$ and Abbe number $V_d$ substantially as listed below

| | | d | $n_d$ | $V_d$ |
|---|---|---|---|---|
| $R_1$ | −75.13 | | | |
| | | 1.5 | 1.62041 | 60.3 |
| $R_2$ | +26.911 | | | |
| | | 2.25 | | |
| $R_3$ | +32.43 | | | |
| | | 4.0 | 1.67270 | 32.2 |
| $R_4$ | +147.2 | | | |
| | | 47 to 4.2 | | |
| $R_5$ | +49.05 | | | |
| | | 1.5 | 1.76182 | 26.5 |
| $R_6$ | +22.081 | | | |
| | | 7.0 | 1.65832 | 57.1 |
| $R_7$ | −65.66 | | | |
| | | to 44.8 | | |
| $R_8$ | −22.081 | | | |
| | | 1.5 | 1.67270 | 32.2 |
| $R_9$ | −38.651 | | | |
| | | 0.1 | | |
| $R_{10}$ | +59.98 | | | |
| | | 4.5 | 1.62606 | 39.1 |
| $R_{11}$ | −52.98 | | | |
| | | 0.1 | | |
| $R_{12}$ | +13.183 | | | |
| | | 7.0 | 1.65844 | 50.8 |
| $R_{13}$ | −30.058 | | | |
| | | 3.4 | 1.67270 | 32.2 |
| $R_{14}$ | +7.691 | | | |
| | | 3.1 | | |
| $R_{15}$ | +13.183 | | | |
| | | 2.0 | 1.65844 | 50.8 |
| $R_{16}$ | +147.2 | | | |